US007024822B2

(12) United States Patent
Scheer et al.

(10) Patent No.: US 7,024,822 B2
(45) Date of Patent: Apr. 11, 2006

(54) ARTICULATING WINDOW HINGES AND ARTICULATING WINDOW ASSEMBLIES

(75) Inventors: Del Wayne Scheer, Oxford, MI (US); David Anderson Webb, Waterford, MI (US); Ramakrishna Putumbaka, Farmington Hills, MI (US); Daniel Edward Laughner, West Point, TN (US); Murray Michael Murphy, Lawrenceburg, TN (US)

(73) Assignee: Dura Global Technologies, Inc., Rochester Hills, MI (US)

(*) Notice: Subject to any disclaimer, the term of this patent is extended or adjusted under 35 U.S.C. 154(b) by 137 days.

(21) Appl. No.: 10/793,381

(22) Filed: Mar. 4, 2004

(65) Prior Publication Data

US 2005/0193633 A1 Sep. 8, 2005

(51) Int. Cl.
*E05D 7/00* (2006.01)
*E05D 7/12* (2006.01)
*B60J 1/12* (2006.01)

(52) U.S. Cl. ............................ 49/397; 49/398; 16/272; 296/146.16; 296/216.02

(58) Field of Classification Search .................. 49/398, 49/397, 381, 394; 16/272, 271, 225, 390, 16/387, 381, 377, 372, 343, 251, 385, 250; 296/146.16, 201, 216.02; 52/208, 204.62, 52/204.69
See application file for complete search history.

(56) References Cited

U.S. PATENT DOCUMENTS

| | | | | |
|---|---|---|---|---|
| 1,469,525 A | * | 10/1923 | Nadolney | 16/271 |
| 1,481,142 A | * | 1/1924 | Minton et al. | 16/271 |
| 2,151,240 A | * | 3/1939 | Soss | 16/251 |
| 4,396,221 A | | 8/1983 | Morgan et al. | |
| 4,511,129 A | | 4/1985 | Kishino | |
| 4,777,699 A | | 10/1988 | Hill et al. | |
| 5,060,440 A | | 10/1991 | Weaver | |
| 5,551,197 A | | 9/1996 | Repp et al. | |
| 5,966,874 A | * | 10/1999 | Repp et al. | 49/398 |
| 6,032,990 A | | 3/2000 | Stone et al. | |

(Continued)

*Primary Examiner*—Hugh B. Thompson, II
(74) *Attorney, Agent, or Firm*—Banner & Witcoff Ltd.; Peter D. McDermott; Dean B. Watson

(57) ABSTRACT

Articulating window assemblies are provided comprising, in combination, a windowpane and a hinge having a hinge axis. The hinge comprises a first hinge member that cooperates with a second hinge member and optionally with a hinge pin to form a hinge joint. The first hinge member has at least an encapsulation section with at least a first encapsulant void, optionally two or more encapsulant voids. A continuous body of encapsulant overlays at least a portion of an outward-facing surface of the encapsulation section, at least partially fills the first encapsulant void, overlays at least a portion of an inward-facing surface of the encapsulation section and overlaps either at least a portion of an external peripheral edge of the encapsulation section, a portion of a void edge defining a second encapsulation void, or both from both the outward-facing surface and the inward-facing surface. This provides a mechanical grip of the first hinge member by the encapsulant. The encapsulant is further bonded to an inner surface of the windowpane to retain the first hinge member, and thereby the hinge, to the windowpane. The windowpane of the window assemblies provided is therefore adapted to rotate or articulate about the hinge axis relative to the second hinge member. No portion of the hinge extends through or overlays any portion of the outer surface of the windowpane, enabling a flush, streamlined appearance. Also provided are vehicles having an articulating window assembly in accordance with those just described.

33 Claims, 7 Drawing Sheets

U.S. PATENT DOCUMENTS

| | | | |
|---|---|---|---|
| 6,123,383 A | 9/2000 | Doerflinger et al. | |
| 6,128,860 A | 10/2000 | Repp et al. | |
| 6,516,494 B1 * | 2/2003 | Nakamoto et al. | 16/271 |
| 6,871,450 B1 * | 3/2005 | Repp et al. | 49/398 |
| 2002/0069590 A1 | 6/2002 | Repp et al. | |
| 2003/0088944 A1 | 5/2003 | Gipson | |

* cited by examiner

ARTICULATING WINDOW HINGES AND ARTICULATING WINDOW ASSEMBLIES

FIELD OF THE INVENTION

This invention relates generally to articulating window assemblies, and more particularly, to vehicle window assemblies that articulate about a hinge attached to one side of a windowpane.

BACKGROUND OF THE INVENTION

Articulated or hinged windows are conventionally fixed to a vehicle body by a mounting assembly that includes a stud passing through a hole drilled in the windowpane. A low profile nut is then threaded onto the stud extending through the windowpane. A major disadvantage is that a significant number of glass panes are broken as a result of drilling the holes through the pane. Panes are also broken during or after mounting the assembly to a vehicle. To avoid breakage of glass panes, sophisticated techniques have been adapted to drill the holes, and the mounting hardware has been adapted to reduce breakage. As a result, the price of such panel assemblies is high. Moreover, the resulting panel is not truly flush since the mounting hardware has a positive relief with respect to the panel exterior surface.

A disadvantage associated with certain known vehicular hinged windows is exposure of a hinge member fastener or cover piece on the exterior surface of the windowpane. The exterior profiles of these window assemblies are not truly flush.

Certain attempts to solve the above problems with a bonded hinge, such as U.S. Pat. No. 6,128,860, employ a bonded requiring a substantial offset between a first latch portion bonded to the windowpane and a second latch portion attached to the window opening frame. Thus, such designs have not been widely commercially adapted for thin window recess applications.

It is an object of the present invention to provide an articulating window assembly that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

In accordance with a first aspect, articulating window assemblies are provided comprising, in combination, a windowpane having an inner surface, an outer surface and a peripheral edge, and a hinge having a hinge axis. The hinge comprises a first hinge member and a second hinge member cooperatively forming a hinge joint with the first hinge member. The first hinge member comprises an encapsulation section having a portion forming at least one encapsulant void. An encapsulant void is a void extending through the encapsulation section, typically in a direction normal to the planes defined by the inward-facing surface and outward-facing surface of the encapsulation section, and fully enclosed by the encapsulation section. The encapsulation section further comprises an outward-facing surface, an inward-facing surface, and an external peripheral edge, that is, a peripheral edge that extends around the external edge, and an internal peripheral edge or edges, also referred to as a void edge or edges, that define the encapsulant void(s). In reference to a peripheral edge or a void edge of the encapsulation section, "edge" refers to the termination of the material that makes up the encapsulation section, and is inclusive of hard, right-angle edges, curved edges, edges formed where the inward-facing surface and outward-facing surface meet to form a knife-edge, and the like. At least a portion of the encapsulation section is encapsulated by encapsulant, such as RIM material as further described below. A continuous body of encapsulant overlays at least a portion of each of the outward-facing surface and the inward-facing surface of the encapsulation section, at least partially fills the encapsulant void, and overlaps at least a portion of the external peripheral edge of the encapsulation section from both the outward-facing surface and the inward-facing surface. This permits the encapsulant to mechanically grip the encapsulation section. Typically, the encapsulant also forms a robust surface-to-surface adhesive bond to the surface of the encapsulant section of the first hinge member. The encapsulant is further bonded to the inner surface of the windowpane, typically via a retaining portion of encapsulant that overlies the outward-facing surface of the encapsulation section and is sandwiched between the outward-facing surface of the encapsulation section and the inner surface of the windowpane to form a bonding layer therebetween. Thus, the windowpane is retained by encapsulant against the encapsulation section and therefore to the first hinge member. As noted above, the first hinge member cooperates with the second hinge member to form a hinge joint about a hinge axis; thus, the windowpane is able to articulate about the hinge axis relative to the second hinge member. No part of the hinge extends through or overlays any portion of the outer surface of the windowpane. That is to say, the hinge is attached to the windowpane solely by being bonded to the windowpane via the encapsulant, with no part of the hinge extending around the peripheral edge of the windowpane to grip the pane, and with no part extending through a hole in the windowpane for attachment by means of a screw, bolt, or the like, which would itself overlay a portion of the exterior surface of the windowpane.

In certain embodiments, the encapsulant overlaps or wraps completely around at least a portion of the external peripheral edge of the encapsulation section of the first hinge member. That is, a unitary or continuous body of encapsulant has surface-to-surface contact with the outward-facing surface, the inward-facing surface and the adjacent external peripheral edge of the encapsulation section. In certain embodiments, the encapsulant likewise wraps completely around the void edge that defines the encapsulant void such that the encapsulant forms a closed loop, further enhancing to the grip of the first hinge member by the encapsulant. The mechanical grip feature, especially taken together with adhesive bonding to the hinge member, provides excellent mounting strength.

In accordance with a second aspect, articulating window assemblies are provided comprising, in combination, a windowpane having an inner surface, an outer surface, and a peripheral edge, and a hinge having a hinge axis. The hinge comprises a first hinge member and a second hinge member cooperatively forming a hinge joint with the first hinge member. The first hinge comprises an encapsulation section member having an outward-facing surface, an inward-facing surface, and an external peripheral edge. The encapsulation section of the first hinge member further comprises a first void edge defining a first encapsulant void and a second void edge defining a second encapsulant void. A continuous body of encapsulant overlays at least a portion of the outward-facing surface of the encapsulation section, at least partially fills the first encapsulant void, overlays at least a portion of the inward-facing surface of the encapsulation section and overlaps at least a portion of the second void edge from both the outward-facing surface and the inward-facing surface. The encapsulant is further bonded to the inner surface of the windowpane, typically via a retaining portion of encapsulant that overlies the outward-facing surface of the encapsulation section and is sandwiched between the outward-facing surface of the encapsulation section and the inner surface of the windowpane to form a bonding layer therebetween. Thus, the windowpane is retained by encapsulant against the encapsulation section and therefore to the first hinge member. Further, no part of the hinge extends through or overlays any portion of the outer surface of the windowpane. The second hinge member in certain embodiments comprises a substantially planar mounting section comprising mounting means for mounting the hinge onto a support structure. The first and second members cooperatively interact to form a hinged joint, typically with a hinge pin, which may be unitary with either the first or the second member or may instead be a distinct component, to form a hinged joint about which the first member can articulate relative to the second member. In this fashion, the windowpane articulates about the hinge axis relative to the second member.

In any of the above embodiments, the encapsulant is optionally remote from the hinge joint, and optionally from the portions of the first hinge member and second hinge member that interact to form the hinge joint, so as to provide clearance of hinge elements from the encapsulant when the hinge is closed and during operation of the hinge. Such a feature is advantageous in that it reduces the packaging depth required, that is to say, the depth of the window assembly taken from the windowpane's outer surface to the inner surface of the substantially planar portion of the second member. Optionally, the encapsulant also extends along both the outward-facing surface and the inward-facing surface of the encapsulation section to extend around at least a portion of the external periphery of the encapsulation section. Other suitable configurations will be readily apparent to those skilled in the art, given the benefit of this disclosure.

An encapsulant void is a hole, aperture, or other suitable void that extends through the encapsulant section from the outward-facing surface to the inward-facing surface, generally perpendicular to a plane defined by the outward-facing surface of the encapsulation section. That is, an encapsulant void is a through-hole extending through the encapsulation section. Encapsulant voids are completely enclosed or surrounded by the encapsulation section. An encapsulant void may be a circular hole, for example, or may instead be rectangular, square, triangular, or any other regular or irregular shape. Where an encapsulation section has more than one encapsulant voids, the encapsulant voids may comprise any of these shapes or any mixture of such shapes. An encapsulant void may be stamped out or cut out of the encapsulation section or otherwise machined out of the section or may be molded into the section. Other suitable voids and other suitable means for creating the voids will be readily apparent to those skilled in the art, given the benefit of this disclosure.

The encapsulation section, as noted above, has an external peripheral edge, which is a peripheral edge that extends around the external edge of the encapsulation section. Such an external periphery need not encompass all sides of the encapsulation section. In particular, for example, the encapsulation section is typically a section or portion of the first hinge member, that is to say, is continuous with the remainder of the first hinge member, such that there is no peripheral edge of the encapsulation section where the encapsulation section joins with or is continuous with the first member. It will be understood that the encapsulation section may be unitary with the remainder of the first hinge member or instead may be a separate piece joined to the remainder of the first member in any appropriate fashion, e.g., welds, bolts, adhesives, etc., and where it is a separate piece, the edge that is joined to the remainder of the first member is not a peripheral edge as used herein. The external peripheral edge of the encapsulation section may itself have cutouts or irregularities that add to the ability of the encapsulant to mechanically grip the encapsulation section. For example, the external peripheral edge may have slots, half-circles or other such cutouts that permit encapsulant to flow and interlock through. Suitable external peripheral edge configurations will be readily apparent to those skilled in the art, given this disclosure.

A continuous body of encapsulant refers to a body of encapsulant that at least partially fills an encapsulant void and overlays the inward-facing surface and outward-facing surface of the encapsulation section as a single body of encapsulant. Such a continuous body may be achieved, for example, by shooting a reaction injection material, such as, for example, RIM material as discussed below, optionally from more than one source. The RIM material will flow into an encapsulation void, at least partially filling the void, and flow over the inward-facing and outward-facing surfaces of the encapsulation section to overlap at least a portion of the external peripheral edge of the encapsulation section, the void edge of another encapsulation void, or both. In certain embodiments, the material will flow around either of these edges to meet up with itself to form a closed loop of material, which will then cure into a single, continuous body of encapsulant to form a mechanical lock. The material will. Similarly, a thermoplastic material may initially comprise multiple bodies of the material, for example a series of beads, that are molded together to form a continuous body. Other suitable continuous bodies of encapsulant, and means for forming such, will be readily apparent to those skilled in the art, given this disclosure.

The encapsulant bonds to the inner surface of the windowpane, typically at a mounting section of the inner surface of the windowpane, to retain the hinge against the windowpane. The encapsulant may be directly bonded to the windowpane, or in the alternative may be bonded through one or more intermediate layers, for example a frit layer or a primer layer or both. Such intermediaries need not themselves be intended to serve primarily as an adhesive or as an adhesion promoter between the windowpane and the encapsulant. For example, a paint layer may be applied to at least portions of the inner surface of the windowpane with the primary purpose of obscuring view of the hinge from the exterior of the vehicle. In certain embodiments, the bonding between the encapsulant and the inner surface of the windowpane, either in the presence of or in the absence of intermediate layers, is the sole means of attaching the windowpane to the hinge, that is to say, nothing extends through, or around the peripheral edge of, the windowpane to cover any part of the outer surface of the windowpane. Such an arrangement advantageously permits the articulating window the ability to have a flush, smooth appearance with nothing protruding through or around the edges of the windowpane to disrupt the continuous plane of the outer surface of the windowpane. In other embodiments, the windowpane is attached to the hinge by means of the bonding of the encapsulant to the inner surface of the windowpane in combination with a mechanical attachment. Such mechanical attachment can be by means of the encapsulant material extending around to overlay one or more peripheral edges of the windowpane, optionally to extend around sufficiently to overlay a portion of the outer surface of the windowpane to mechanically retain the pane. In other embodiments, the encapsulant may extend into or through a through-hole in the windowpane to mechanically grip the windowpane. In yet other embodiments, the bonding of the encapsulant to the inner surface of the windowpane may be combined with other known means for attaching a hinge to a windowpane, such as, for example, by screws or bolts, either coupling the hinge directly to the windowpane or attaching the hinge to a secondary member such as a frame member that is itself attached to the windowpane. Other suitable means for attaching the windowpane to the encapsulant will be readily apparent to those skilled in the art, given the benefit of this disclosure.

In accordance with yet other aspects, vehicles are provided having one or more articulating window assemblies in accordance with any of the aspects or embodiments presented herein. In these embodiments, the hinge is attached or mounted, typically rigidly attached or mounted, to the vehicle, typically at a mounting section of the second member of the hinge. In this fashion, the windowpane is capable of articulating relative to the vehicle, for example, from a closed position to an open position. In certain embodiments the encapsulant is bonded to the inner surface of the windowpane such that the encapsulant does not contact the outer surface or the peripheral edges of the windowpane, improving the streamlining and outward appearance of the window assembly. In certain embodiments, the window assembly is flush-mounted, that is, is mounted so that the outer surface of the windowpane is flush with an outer surface of the vehicle with no encapsulant or other mounting structure or material extending beyond a plane defined by the outer surface of the windowpane. This enables a smooth, streamlined appearance that is desirable in modern vehicles.

Without wishing to be bound by theory, it is currently understood that in at least certain embodiments of the window assemblies shown here, the stresses on the encapsulant are substantially reduced at the attachment area since the window rotates, pivots or articulates about a mechanical joint and does not require that a substantial portion of the pivoting stresses be accommodated by the encapsulant. Additionally, the window assemblies provided herein are advantageous because a more compact hinged joint is possible, requiring less protrusion into the interior of the structure, for example, the vehicle, to which it may be mounted.

These and additional features and advantages of the invention disclosed here will be further understood from the following detailed disclosure of certain preferred embodiments.

Figure 1:
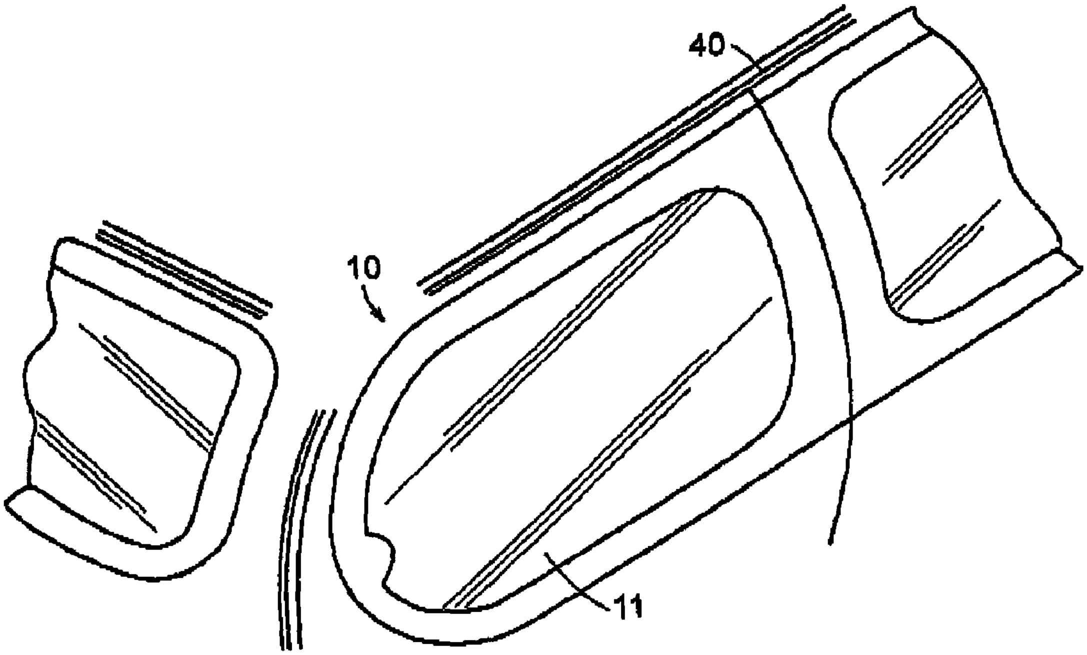
FIG. 1 is a perspective view of an embodiment of an articulated window assembly shown assembled in a motor vehicle.

It should be understood that the appended drawings are not necessarily drawn to scale, and should be understood to present a representation of various features illustrative of the basic principles of the invention. The specific design features of an articulated window assembly as disclosed here, including, for example, specific dimensions, configurations and particular components, will be determined in part by the particular intended application and use environment. Certain features of the illustrated embodiments have been enlarged or distorted relative to others to facilitate visualization and clear understanding. In particular, thin features may be thickened, for example, for clarity of illustration. The same reference numbers are used in the drawings for similar or identical components and features shown in various alternative embodiments. All references to direction and position, unless otherwise indicate, refer to the orientation of the articulated window assemblies illustrated in the drawings.

DETALED DESCRIPTION OF CERTAIN EMBODIMENTS

It will be apparent to those skilled in the art, that is, to those who have knowledge or experience in this area of technology, that many uses and design variations are possible for the articulated window assemblies disclosed here. The following detailed discussion of various alternative features and embodiments will illustrate the general principles of the invention with reference to a flush mounted window assembly for use as a side window or quarter window on a minivan-type motor vehicle. Other embodiments suitable for other applications, such as articulating windows, three-sided flip windows and liftgates for automobiles, pickup trucks, sport utility vehicles, cross-over vehicles, or van conversions, will be apparent to those skilled in the art given the benefit of this disclosure.

Figure 2:
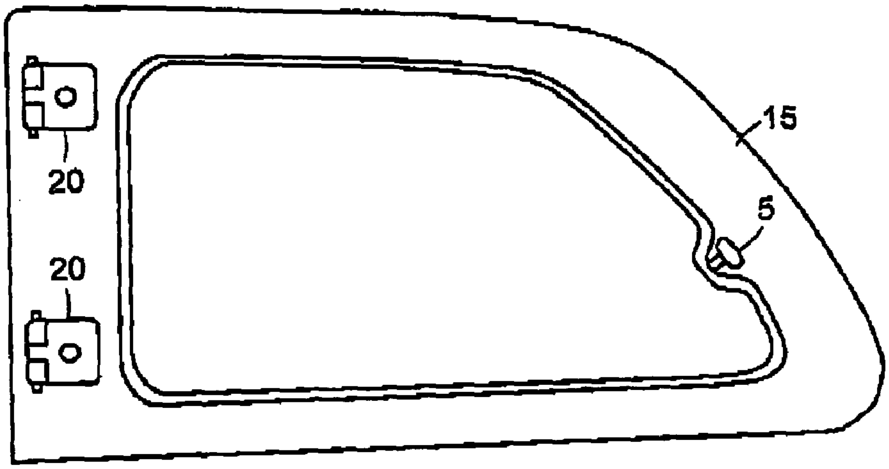
FIG. 2 is an elevation view of the inner surface of the window assembly of FIG. 1, showing an inner surface of the windowpane.
Figure 3:
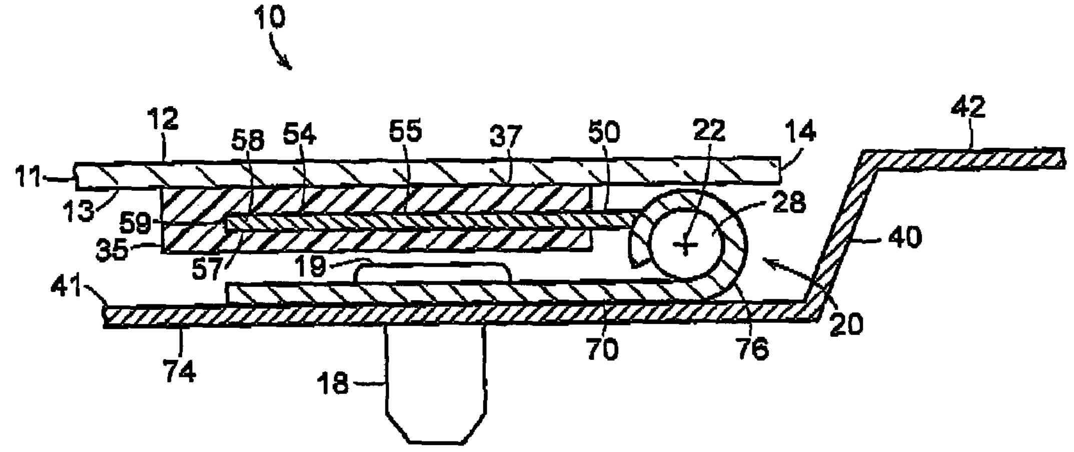
FIG. 3 is a cross sectional view, partially broken away, of an embodiment of an articulated window assembly, shown in a closed position.
Figure 4:
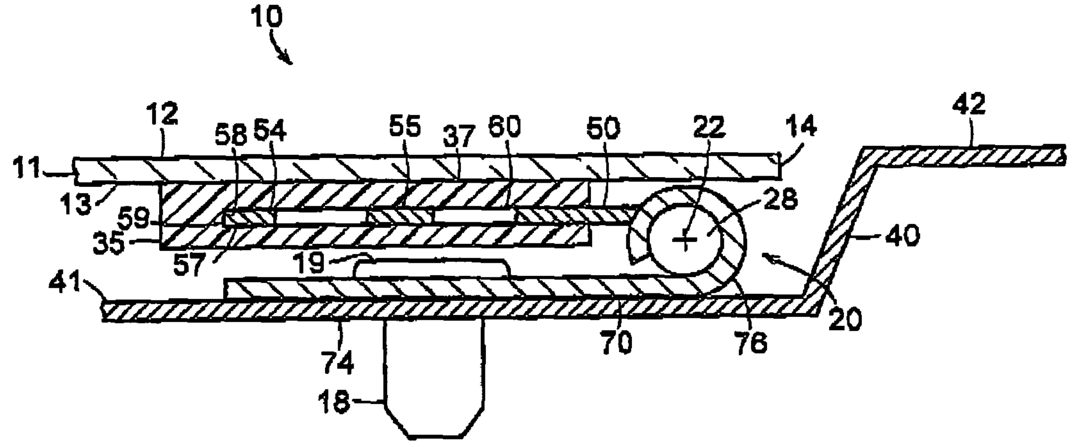
FIG. 4 is a cross sectional view, partially broken away, of an embodiment of an articulated window assembly, shown in a closed position.
Figure 5:
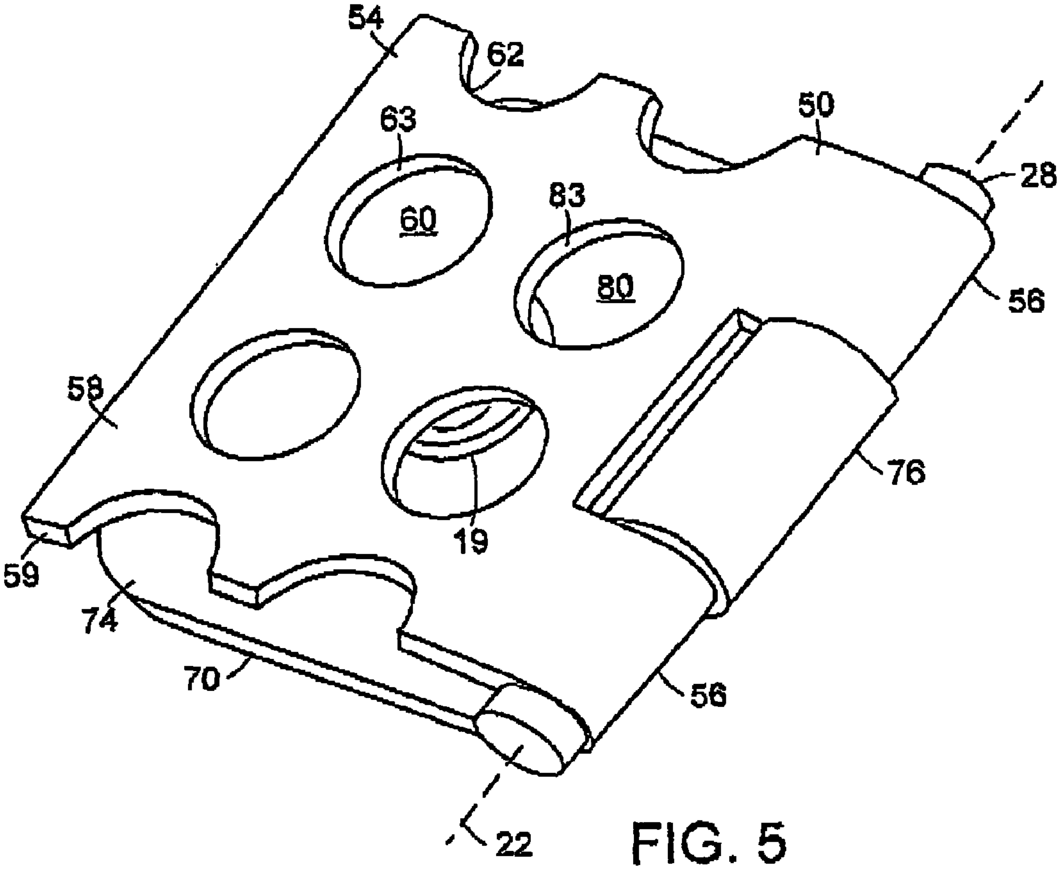
FIG. 5 is a perspective view of an embodiment of a hinge, shown without the encapsulant.
Figure 7:
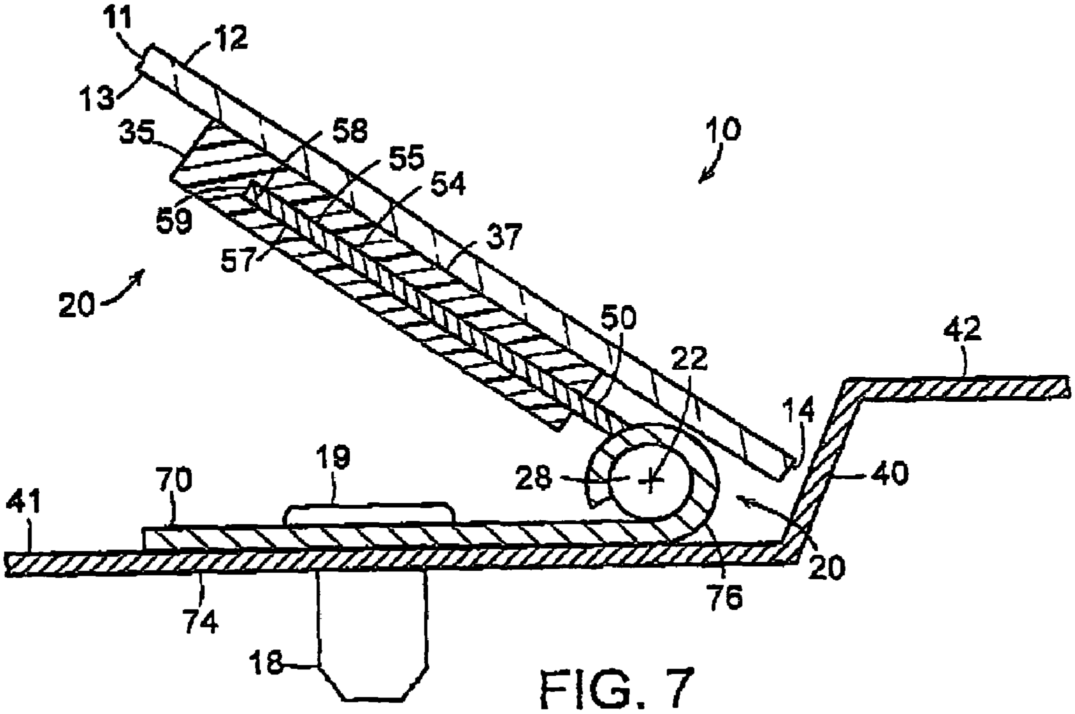
FIG. 7 is a cross sectional view of the embodiment of FIG. 3, shown in an open or articulated position.

Referring now to the drawings, FIGS. 1 and 2 show an embodiment of an articulating window assembly 10 mounted in a motor vehicle body panel 40. Windowpane 11 may be comprised of glass, tempered glass, laminated glass, plexiglass, clear plastic, or other suitable materials. The windowpane in certain embodiments may further comprise a frit layer, tinting agent, paint layer and/or other such layer or coating applied to its inner or outer surface, for example to provide an articulating window that bars view of the interior of the vehicle or to conceal the mounting elements, such as, e.g., the hinge or hinges and the latch, from view from the exterior of the vehicle. Windowpane 11 is pivotable between a closed position as shown and an open position (not shown). Windowpane 11 has an outer surface 12, an inner surface 13, and a peripheral edge 14. An opaque frit 15 is positioned around the peripheral edge, on the interior surface 13, concealing attachment mechanisms such as hinge 20 and a latch mount 5 from exterior view. Where the windowpane 11 is made of glass, the frit is commonly a ceramic frit. It should be understood that reference here to the inner surface 13 of the windowpane 11 refers to the inner surface of the windowpane with or without frit, primer, etc. Window assembly 10 is located in a recess defined by peripheral ledge 41 of body panel 40 surrounding and closing an opening. In certain embodiments, outer surface 12 of windowpane 11 is positioned generally flush with an exterior surface 42 of motor vehicle body panel 40 to provide a streamlined, substantially continuous outer surface of the vehicle that results in improved fuel efficiency and a more aesthetic appearance. Optionally, a conventional seal assembly may be positioned around the window assembly to prevent water, dirt and the like from entering the motor vehicle through opening when the window assembly is in the closed position. Other suitable positions for the articulating window assembly will be readily apparent to those skilled in the art, given the benefit of this disclosure.

Figure 8A:
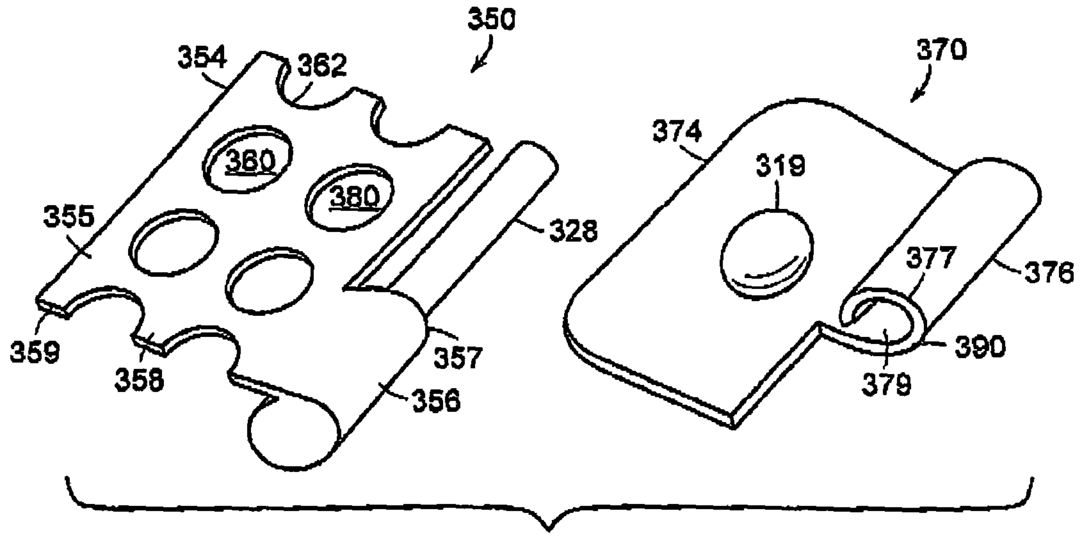
FIGS. 8A and 8B are perspective views of embodiments of a first hinge member, second hinge member and hinge pin, shown disassembled for clarity purposes.
Figure 8B:
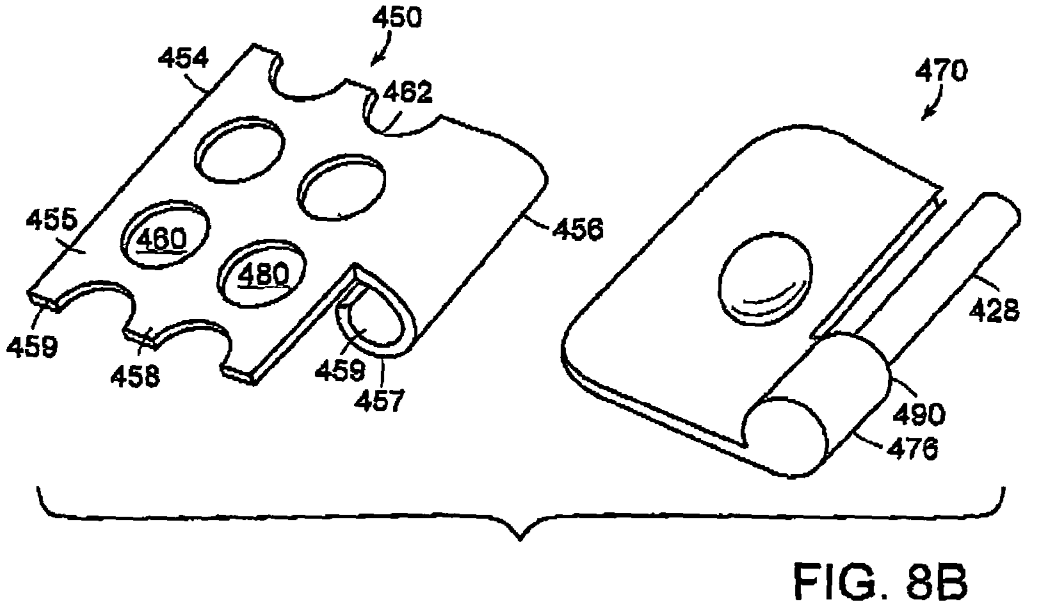

Hinge 20 in certain embodiments, such as those illustrated in FIGS. 3–7, comprises a first hinge member 50 and a second hinge member 70 that cooperatively interact, along with hinge pin 28, to form a hinge joint about a hinge axis 22. First hinge member 50 has an encapsulation section 54 and one or more hinge knuckles 56 that cradle or capture hinge pin 28. Second hinge member 70 likewise has one or more knuckles 76 that also cradles hinge pin 28. Knuckles 56 and 76 comprise sections, typically curved or arcuate sections, of the first and second members, respectively, which interact to form the hinge joint with the hinge pin. In certain embodiments, knuckles 56 and 76 cooperate to form a barrel having a hollow center or channel for receiving or capturing the hinge pin. In certain embodiments, for example that illustrated in FIG. 5, hinge pin 28 is a separate and distinct element from both the first and second hinge members. In other embodiments, for example those illustrated in FIGS. 8A and 8B, the hinge pin is unitary with either the first hinge member or the second hinge member. In FIG. 8A, first hinge member 350 has an encapsulation section 354 having encapsulant voids 360, 380. Knuckle 356 extends away from encapsulation section 354. Hinge pin 328 extends from knuckle 356, typically in a direction that will be upward when the hinge is mounted, such that a barrel shoulder 390 in second hinge member 370 will reside against knuckle shoulder 357 and support the weight of the first hinge member when installed. Second hinge member 370 has a mounting section 374 having a mounting stud, not seen, topped by a mounting stud head 319. Knuckle 376 extends away from mounting section 374 and curves or curls about itself to form barrel 377 that defines hinge pin-receiving channel 379 and that defines knuckle shoulder 390. FIG. 8B shows an embodiment having the opposite configuration; first hinge member 450 has knuckle 456 extending away from encapsulation section 454 and curving or curling about itself to form barrel 457 defining hinge pin-receiving channel 459, while second hinge member 470 has knuckle 476 extending away from mounting section 474, with hinge pin 428 extending away from knuckle 476 and with knuckle shoulder 490 next to barrel shoulder 457 to be able to support the weight of the first hinge member when installed. Other suitable configurations for the hinged joint will be readily apparent to those skilled in the art, given this disclosure.

Referring again to FIGS. 3–7, encapsulation section 54 of first hinge member 50 has an outward-facing surface 55, an inward-facing surface 57, an external peripheral edge 59, and a portion 58 having a first encapsulant void 60 and a second encapsulant void 80. The external peripheral edge 59 includes semi-circular cutouts 62. As with the encapsulant voids, encapsulant cutouts 62 may be stamped out or cut out of the encapsulation section or otherwise machined out of the section, may be molded into the section, or may be formed in other fashions known to those skilled in the art. First and second encapsulant voids are defined by first void edge 63 and a second void edge 83, respectively, and are located entirely within, fully enclosed by or entirely surrounded by the encapsulation section. Other suitable encapsulation section configurations will be readily apparent to those skilled in the art, given this disclosure.

Figure 6A:
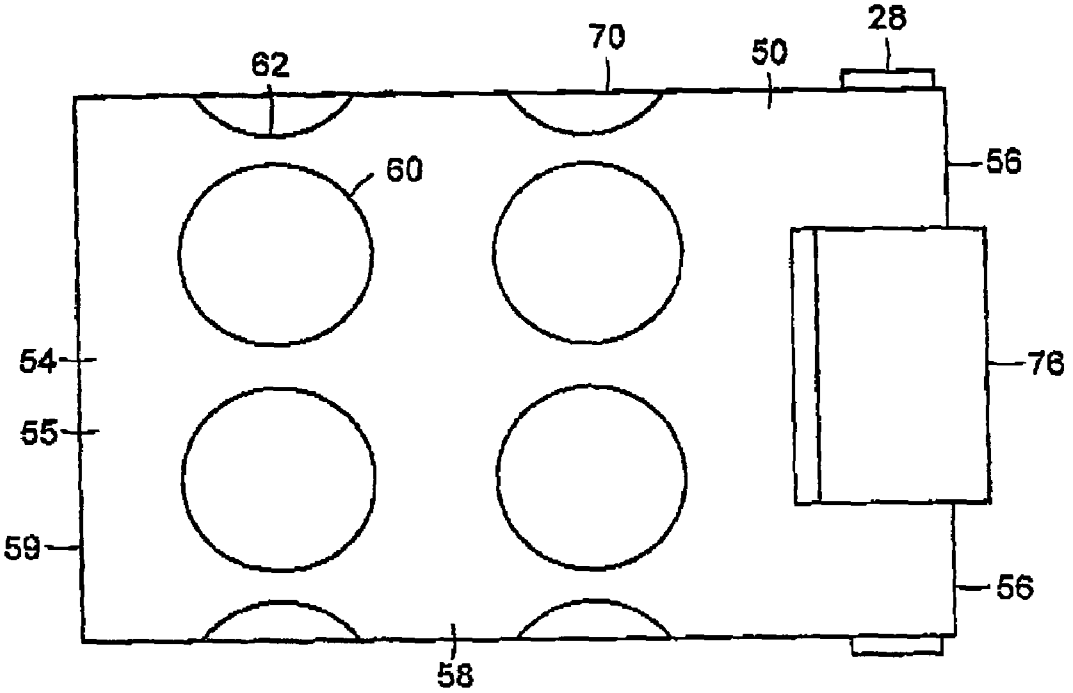
FIGS. 6A and 6B are elevation views of various embodiments of hinges, shown without the encapsulant for the sake of illustrating the first hinge member embodiments.
Figure 6B:
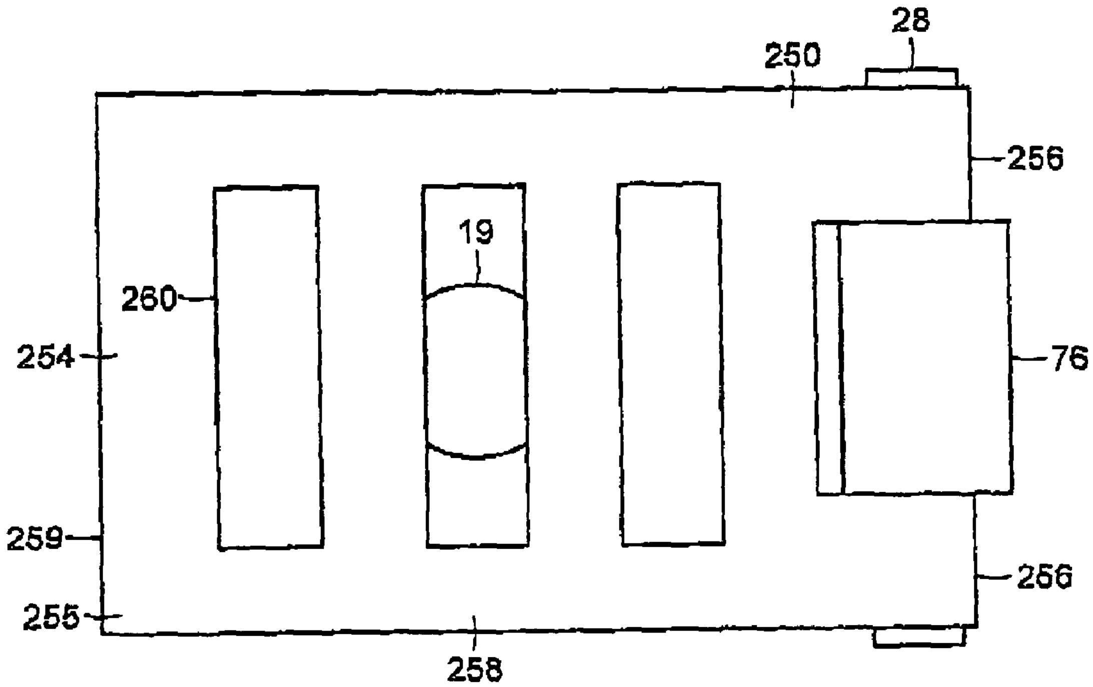

The encapsulation section is at least partially encapsulated with encapsulant 35 such that at least one encapsulant void 60 is encapsulated, that is to say, is at least partially filled with encapsulant. Optionally, the encapsulation section is planar or substantially planar to lie parallel to the inner surface of windowpane 11. Where windowpane 11 is itself not substantially planar, the encapsulation section may be curved or shaped to match the curvature or shape of the inner surface of the windowpane to more optimally support the weight of the windowpane. Optionally, part or all of one or both sides of encapsulant section 54 may be coated with a suitable primer or adhesive to increase bonding to polymer 35. Encapsulant section 54 has at least one, and typically more than one, for example, two, three, four or more encapsulant voids, which, as described above, may be any size and shape suitable to permit the encapsulant to flow through and meld to itself to greatly increase the retaining strength of the encapsulant on the hinge. FIGS. 6A and 6B illustrate two embodiments of first hinge members having differing encapsulant void configurations. In FIG. 6A, which corresponds with the embodiment illustrated in FIGS. 3 and 4, encapsulation section 54 includes circular encapsulant voids 60 and semicircular cutouts 62. FIG. 6B shows an encapsulant section 254 having fully enclosed rectangular encapsulant voids 260. Other suitable shapes and configurations for the encapsulant void or voids will be recognized by one skilled in the art, given the benefit of the present disclosure.

Figure 9A:
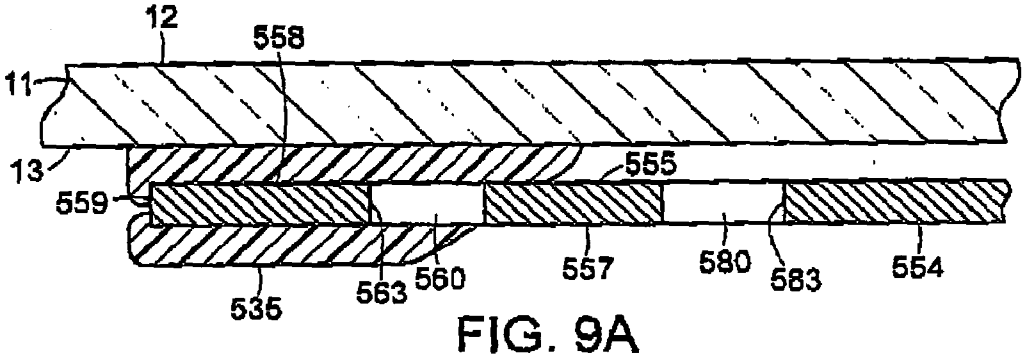
FIGS. 9A–9C are cross sectional views, partially broken away, of embodiments of the encapsulation sections, encapsulant, and windowpanes.
Figure 9B:
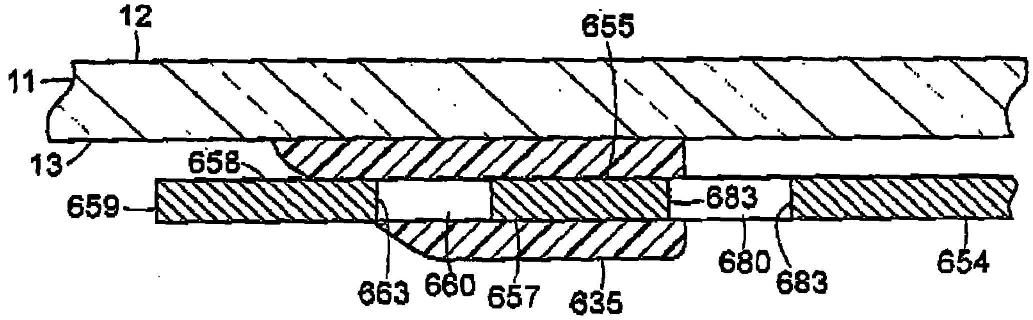
Figure 9C:
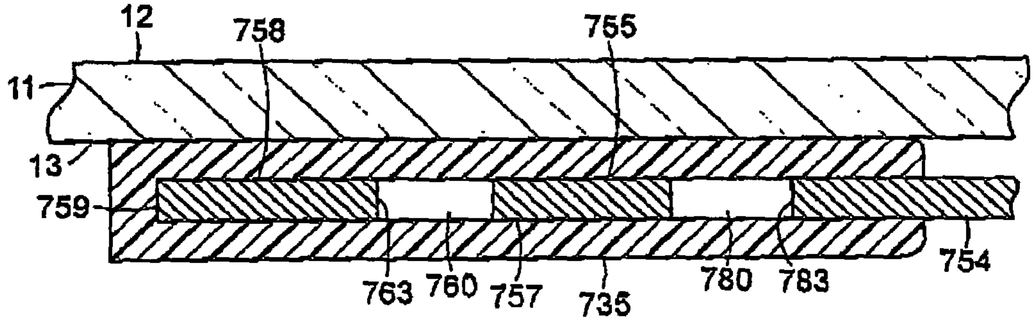

In certain embodiments, exemplified in FIG. 9A, a continuous body of encapsulant 535 partially fills at least one encapsulant void 560, overlays a portion of both the outward-facing surface 555 and the inward-facing surface 557 of encapsulation section 554, and overlaps a portion of the external peripheral edge 559 of encapsulation section 554 from both the outward-facing surface and the inward-facing surface of the encapsulation section. In other embodiments, exemplified in FIG. 9B, encapsulant 635 encapsulates at least a portion of the encapsulation section 654 to partially fill the first encapsulant void 660, to overlay a portion of both the outward-facing surface 655 and the inward-facing surface 657 of encapsulation section 654 and to overlap a portion of second void edge 683 from both the inward-facing surface and the outward-facing surface of the encapsulation section. Optionally the encapsulant would completely or at least partially fill the second void. In certain embodiments, exemplified in FIG. 9C, encapsulant 735 encapsulates a portion of the encapsulation section 754 to completely fill the first encapsulant void 760, to overlay a portion of both the outward-facing surface 755 and the inward-facing surface 757 of encapsulation section 754 and to completely second void edge 783 to completely fill second encapsulant void 780, and further to completely overlap a portion of external peripheral edge 759 of the encapsulation section 754. A portion of an edge is completely overlapped when the edge is overlapped such that the continuous body of encapsulant extends from the outward-facing surface completely across the edge in a lateral direction to the portion of encapsulant that overlays the inward-facing surface of the encapsulation section. In such a fashion, the continuous body of encapsulant forms a closed loop between the encapsulant void and the external peripheral edge of the encapsulation section, the void edge of a second encapsulant void, or both. In certain preferred embodiments, the continuous body of encapsulant completely fills multiple encapsulant voids and completely overlaps the entire external peripheral edge of the encapsulation section. Other suitable configurations will be readily apparent to those skilled in the art, given the benefit of the present disclosure.

In certain embodiments, the encapsulant is comprised of a polymer, plastic, thermoplastic elastomer (TPE) or plastomer. The polymer may be comprised of thermoplastic polymer, thermosetting polymer or a mixture of both. Suitable thermoplastic polymers include, for example, acrylics, acrylonitrile-butadiene-styrenes (ABS), high-impact polystyrene (PS, HIPS), ionomers, polyamides, polyamide-imides, polyarylates (PAR), polyaryletherketone (PAEK, PEK, PEEK, PEKK), polybutylene terephthalates (PBT), polyether sulfones (PES, PESV), polyethylenes, polyvinyl chloride (PVC), thermoplastic polyimides (TPI), styrene-acrylonitriles (SAN, OSA, ASA), and styrene-maleic anhydride (SMA). Suitable thermosetting polymers include, for example, allyls (DAP, DAIP), alkyd, amino's, cyanates, epoxy, phenolics, polyurethanes (PUR), and urethane hybrids. Combinations of any of the above may also be employed. Other suitable encapsulant materials will be readily apparent to those skilled in the art, given the benefit of this disclosure.

Optionally, reinforcing materials, such as, for example, fibers may be added to increase the strength of the encapsulant material, for example, to increase load-carrying capacity. The reinforcing materials may be embedded into encapsulant, typically spaced away from the encapsulant section and optionally extending through one or more of the encapsulant voids. Other suitable reinforcing materials will be readily apparent to those skilled in the art, given this disclosure.

In certain embodiments, the encapsulant is composed of a reaction injection molded polyurethane (RIM) system, formed by injecting a polyol and an isocyanate together into a mold cavity of a heated mold and allowing the system to cure. The shape of the mold cavity will determine the shape or location of the encapsulant. The polyurethane system may in the alternative comprise structural reaction injection molding (SRIM) or composite reaction injection molding (RRIM). Other suitable polyurethane materials or systems will be apparent to those skilled in the art given the benefit of this disclosure.

The encapsulant secures hinge 20 to windowpane 11 by bonding to inner surface 13 of windowpane 11 at first mounting section 37, which is located along the inner surface 13, typically at or near a peripheral edge of the windowpane. In certain embodiments, for example certain of those utilizing a polyurethane system, the encapsulant is injected directly against the windowpane. Optionally, primer, adhesive promoter or adhesive is applied to inner surface 13 of windowpane 11 prior to application of the encapsulant 35 to windowpane 11. In other embodiments, a frit layer, paint layer or the like is located between the windowpane and the encapsulant, while in yet other embodiments, a combination of two or more layers comprising frit, primer, and/or adhesive are employed. In certain embodiments, primer is applied to the encapsulation section of the hinge prior to its being encapsulated. It will be understood that the encapsulant is bonded to the inner surface of the windowpane where the encapsulant is bonded to a portion of the inner surface of the windowpane or is injected directly against the windowpane, where one or more layers of frit, primer, adhesive, paint or the like, or combinations of such, is interposed between the encapsulant and the inner surface of the windowpane. The primer may be a silane primer, such as, for example, when the encapsulant is composed of RIM material and windowpane 11 has a surface comprised of soda-lime-silica glass. Examples of silane primers include Chemlok® 144 and Chemlok® AP-134, manufactured by Lord Corporation of Erie, Pa. Without wishing to be bound by theory, it currently is believed that the primer contains silane groups that bond with hydroxyl groups of the surface of such a windowpane and bond with the isocyanates of the polyurethane, thereby forming an excellent bond between the windowpane and the RIM material. Other combinations of windowpane surface treatments and encapsulant materials will be apparent to those skilled in the art given the benefit of this disclosure.

Articulated window assembly 10 is mounted to motor vehicle body panel 40, typically to a recessed shelf 41 of body panel 40, by mounting stud 18 located on a mounting section 74 of second hinge member 70 of hinge 20. Mounting section 74 is typically planar or substantially planar, with the exception of any mounting structure contained thereon. Mounting stud 18 extends through a mounting hole (not illustrated) in the second hinge member, with mounting stud head 19 being flush against second hinge member 70. In other embodiments, the mounting stud is unitary with the second hinge member. Mounting stud 18 may in certain embodiments be threadedly attached to body panel 40, for example, by being threaded to screw into a threaded hole in body panel 40, or to be bolted to body panel 40 and retained by a nut. Alternatively, the hinge may be mounted to the vehicle by a nut and bolt configuration, by welds, adhesives, rivets, or other means that will be readily apparent to those skilled in the art, given this disclosure. Optionally, articulating window assembly 10 is flush mounted such that the outer surface 12 of windowpane 11 is flush, or substantially flush, with an outer surface 42 of body panel 40. Other suitable mounting configurations will be readily apparent to those skilled in the art, given this disclosure.

Optionally, where it is desirable that parts of the hinge be free of encapsulant, those parts can be coated with a layer of barrier coat on such as Monocoat® 1021w or Monocoat® 472w manufactured by Chem-Trend Inc. of Howell, Mich., to prevent encapsulant from adhering to the hinge parts. This assures that encapsulant 35 does not prevent or inhibit the articulation of the hinge.

Any or all of first and second hinge members 50 and 70 and hinge pin 28 may be made of any suitable material such as, for example, metal or plastic. In certain embodiments, these members are made of die cast zinc. Alternatively, they may be made of aluminum, steel, thermoplastic, thermoset plastic or magnesium and may be formed using a cast process, injection process, die casting process, forging process or machining. Where appropriate, mixtures of any of the above materials and or techniques for forming the components may be employed. Any or all of these components may optionally be electroplated or painted, for example, to resist corrosion and, where appropriate, to promote adhesion to encapsulant 35. Other suitable compositions and method of forming the first and second hinge members of the hinge, and of the hinge pin, will be readily apparent to those skilled in the art, given the benefit of this disclosure.

Figure 10:
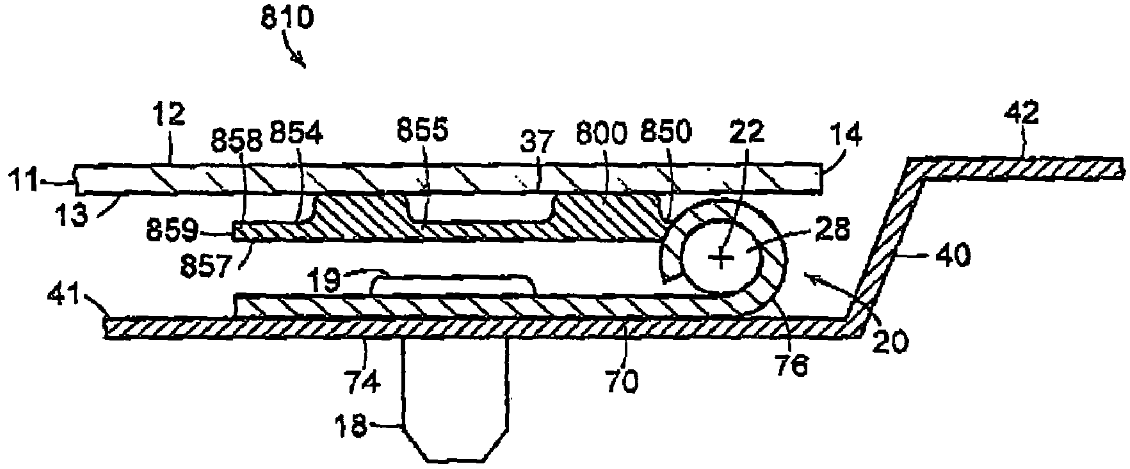
FIG. 10 is a cross sectional view, partially broken away, of an embodiment of an articulated window assembly, shown without the encapsulant to illustrate the standoffs.

In certain embodiments, such as, for example, those illustrated in FIG. 10, one or more standoffs 800 are located on the outward-facing surface of the first hinge member. Such standoffs serve to set the distance between the windowpane 11 and the hinge 820 and to hold the hinge stable relative to the windowpane when the encapsulant, not illustrated, is injected or otherwise molded or located around the encapsulation section 854. The standoffs typically are located partially or entirely within the encapsulation section such that they will be surrounded by encapsulant, although standoffs may be located outside of the encapsulation section. Standoffs 800 may in certain embodiments be unitary with the first hinge member and may comprise indentations or instead may comprise areas of greater thickness than the remainder of the encapsulation section. In other embodiments, the standoffs comprise separate pieces or members that are placed onto, attached or adhered to the first hinge member prior to placing the hinge in the mold. The standoffs may comprise any suitable material, including any of the encapsulant materials identified above, which will typically be in cured or hardened form prior to being utilized as a standoff. For example, cured RIM or other suitable polymer can be utilized, provided it can withstand the temperatures and forces to be applied in the mold. The standoffs may in certain embodiments be placed against, attached to or adhered to the first mounting section of the windowpane prior to its being placed in the mold. Suitable materials for the standoff will be readily apparent to those skilled in the art, given the benefit of this disclosure.

Manufacturing of certain embodiments of the articulating window assemblies is accomplished by inspecting, preparing and cleaning a windowpane. Where desired, primer 39 is applied to inner surface 13 of the windowpane 11. The hinge 20 and the optionally primed windowpane are inserted into a mold cavity of a mold, which is then closed. Encapsulant material is injected into the mold cavity, at least partially encapsulating the encapsulation section of the hinge and contacting the mounting section of the inner surface of the windowpane, attaching the hinge to the windowpane. The hinge 20 is bonded to inner surface 13 of windowpane 11. The articulating window assembly can then be removed from the mold cavity. Where the encapsulant is comprised of material not suitable for injection molding, other appropriate techniques of forming and optionally curing the material, which are known in the art, are employed. Other suitable means for manufacturing window assemblies in accordance with those disclosed herein will be readily apparent to those skilled in the art, given the present disclosure.

In operation, when an operator or passenger in the motor vehicle wishes to open window assembly 10, latch 5 is disengaged from body panel 40 thereby permitting windowpane 11 to articulate outboard of the motor vehicle about hinge 20. Hinge 20 permits windowpane 11 to pivot about axis 22 from a closed position to an open position and back.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled. While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. An articulating window assembly comprising, in combination:

a windowpane having an inner surface, an outer surface, and a peripheral edge;

a hinge having a hinge axis, the hinge comprising:

a first hinge member having at least an encapsulation section with an outward-facing surface, an inward-facing surface, an external peripheral edge, and a portion forming at least one encapsulant void;

a second hinge member cooperatively forming a hinge joint with the first hinge member; and a continuous body of encapsulant overlying at least a portion of the outward-facing surface of the encapsulation section, at least partially filling the encapsulant void, overlaying at least a portion of the inward-facing surface of the encapsulation section and overlapping at least a portion of the external peripheral edge of the encapsulation section from both the outward-facing surface and the inward-facing surface;

wherein the encapsulant is bonded to the inner surface of the windowpane, and wherein no part of the hinge extends through or overlays any portion of the outer surface of the windowpane.

2. The articulating window assembly of claim 1 wherein the encapsulant completely overlaps at least a portion of the external peripheral edge of the encapsulation section from both the outward-facing surface and the inward-facing surface.

3. The articulating window assembly of claim 1 wherein the encapsulant is comprised of material selected from the group consisting of an elastomer, a thermoplastic, a thermoset plastic, and mixtures thereof.

4. The articulating window assembly of claim 1 wherein the encapsulant is comprised of material selected from the group consisting of polyurethane, polyvinyl chloride, thermoplastic elastomers, acrylonitrile butadiene styrene, polymethyl methacrylate, polyamide and mixtures thereof.

5. The articulating window assembly of claim 1, further comprising a hinge pin that defines the hinge axis.

6. The articulating window assembly of claim 5, wherein the hinge pin is unitary with the second hinge member.

7. The articulating window assembly of claim 5, wherein the hinge pin is unitary with the first hinge member.

8. The articulating window assembly of claim 5, wherein the first hinge member comprises at least one knuckle to engage the hinge pin.

9. The articulating window assembly of claim 5, wherein the second hinge member comprises at least one knuckle to engage the hinge pin.

10. The articulating window assembly of claim 1, wherein the encapsulation section is substantially planar.

11. The articulating window assembly of claim 1, wherein the second hinge member further comprises a substantially planar mounting section.

12. The articulating window assembly of claim 1, wherein the encapsulant is bonded to the inner surface of the windowpane at a mounting section of the inner surface of the windowpane.

13. The articulating window assembly of claim 12, wherein the mounting section of the inner surface of the windowpane comprises primer.

14. The articulating window assembly of claim 12, wherein the mounting section of the inner surface of the windowpane comprises frit.

15. The articulating window assembly of claim 12, wherein the mounting section of the inner surface of the windowpane comprises adhesive.

16. The articulating window assembly of claim 1, wherein the encapsulant does not contact the peripheral edge of the windowpane.

17. The articulating window assembly of claim 1 wherein the second hinge member comprises mounting means for mounting the attachment member to a support structure.

18. The articulating window assembly of claim 1, wherein the encapsulant is remote from the hinge axis.

19. The articulating window assembly of claim 1, further comprising a standoff extending outwardly from the outward-facing surface of the first member.

20. The articulating window assembly of claim 19, wherein the standoff is unitary with the first hinge member.

21. An articulating window assembly comprising, in combination:

a windowpane having an inner surface, an outer surface, and at least one peripheral edge;

a hinge having a hinge axis, the hinge comprising:

a first hinge member having at least an encapsulation section with an outward-facing surface, an inward-facing surface, an external peripheral edge, a first void edge defining a first encapsulant void and a second void edge defining a second encapsulant void;

a second hinge member cooperatively forming a hinge joint with the first hinge member; and a continuous body of encapsulant overlying at least a portion of the outward-facing surface of the encapsulation section, at least partially filling the first encapsulant void, overlaying at least a portion of the inward-facing surface of the encapsulation section and overlapping at least a portion of the second void edge from both the outward-facing surface and the inward-facing surface;

wherein the encapsulant is bonded to the inner surface of the windowpane, and wherein no part of the hinge extends through or overlays any portion of the outer surface of the windowpane.

22. The articulating window assembly of claim 21, wherein the continuous body of encapsulant overlaps at least a portion of the external peripheral edge of the encapsulation section from both the outward-facing surface and the inward-facing surface.

23. The articulating window assembly of claim 21 wherein the encapsulant completely fills the first encapsulant void.

24. The articulating window assembly of claim 21 wherein the encapsulant completely overlaps at least a portion of the second void edge.

25. The articulating window assembly of claim 24 wherein the encapsulant completely fills the second encapsulant void.

26. The articulating window assembly of claim 21, further comprising a standoff extending outwardly from the outward-facing surface of the first member.

27. The articulating window assembly of claim 26, wherein the standoff is unitary with the first hinge member.

28. A vehicle comprising an articulating window assembly, the window assembly comprising, in combination:

a windowpane having an inner surface, an outer surface, and a peripheral edge;

a hinge having a hinge axis, the hinge comprising:

a first hinge member having at least an encapsulation section with an outward-facing surface, an inward-facing surface, an external peripheral edge, and a portion forming at least one encapsulant void;

a second hinge member cooperatively forming a hinge joint with the first hinge member; and a continuous body of encapsulant overlying at least a portion of the outward-facing surface of the encapsulation section, at least partially filling the encapsulant void, overlaying at least a portion of the inward-facing surface of the encapsulation section and overlapping at least a portion of the external peripheral edge of the encapsulation section from both the outward-facing surface and the inward-facing surface;

wherein the encapsulant is bonded to the inner surface of the windowpane, and wherein no part of the hinge extends through or overlays any portion of the outer surface of the windowpane.

29. The vehicle of claim 28, wherein the second hinge member is threadedly attached to the vehicle.

30. The vehicle of claim 28, wherein the second hinge member comprises means for mounting the hinge to the vehicle.

31. The vehicle of claim 28, wherein the encapsulant does not contact the peripheral edge of the windowpane.

32. The vehicle of claim 28, wherein the vehicle comprises a body panel in which the articulating window assembly is mounted, the body panel having an outer surface, and wherein the outer surface of the windowpane is substantially flush with the outer surface of the body panel.

33. A vehicle comprising an articulating window assembly, the window assembly comprising, in combination:

a windowpane having an inner surface, an outer surface, and one or more peripheral edges;

a hinge having a hinge axis, the hinge comprising:

a first hinge member having at least an encapsulation section with an outward-facing surface, an inward-facing surface, an external peripheral edge, a first void edge defining a first encapsulant void and a second void edge defining a second encapsulant void;

a second hinge member cooperatively forming a hinge joint with the first hinge member; and a continuous body of encapsulant overlying at least a portion of the outward-facing surface of the encapsulation section, at least partially filling the first encapsulant void, overlaying at least a portion of the inward-facing surface of the encapsulation section and overlapping at least a portion of the second void edge from both the outward-facing surface and the inward-facing surface;

wherein the encapsulant is bonded to the inner surface of the windowpane, and wherein no part of the hinge extends through or overlays any portion of the outer surface of the windowpane.

* * * * *